United States Patent
Globerman et al.

(10) Patent No.: US 11,046,426 B2
(45) Date of Patent: Jun. 29, 2021

(54) SYSTEM, ASSEMBLIES AND METHODS FOR MECHANICAL-THRUST POWER CONVERSION MULTIFANS

(71) Applicant: N.M.B. MEDICAL APPLICATIONS LTD, Herlizya (IL)

(72) Inventors: Oren Globerman, Kfar-Shmaryahu (IL); Mordechay Beyar, Caesarea (IL)

(73) Assignee: N.M.B. MEDICAL APPLICATIONS LTD, Herzliya (IL)

( * ) Notice: Subject to any disclaimer, the term of this patent is extended or adjusted under 35 U.S.C. 154(b) by 311 days.

(21) Appl. No.: 16/068,920

(22) PCT Filed: Jan. 18, 2017

(86) PCT No.: PCT/IL2017/050069
§ 371 (c)(1),
(2) Date: Jul. 10, 2018

(87) PCT Pub. No.: WO2017/125923
PCT Pub. Date: Jul. 27, 2017

(65) Prior Publication Data
US 2018/0370623 A1 Dec. 27, 2018

Related U.S. Application Data

(60) Provisional application No. 62/280,762, filed on Jan. 20, 2016.

(51) Int. Cl.
*B64C 27/10* (2006.01)
*B64C 27/20* (2006.01)

(52) U.S. Cl.
CPC .............. *B64C 27/10* (2013.01); *B64C 27/20* (2013.01)

(58) Field of Classification Search
CPC .... B64C 2201/108; B64C 27/20; B64C 27/10
See application file for complete search history.

(56) References Cited

U.S. PATENT DOCUMENTS

| 2,382,460 | A | 8/1945 | Young |
| 4,088,352 | A | 5/1978 | Kling |

(Continued)

FOREIGN PATENT DOCUMENTS

| CN | 101693146 | 4/2010 |
| CN | 102114914 A | 7/2011 |

(Continued)

OTHER PUBLICATIONS

International Search Report of Appliation No. PCT/IL2017/050069 dated Apr. 20, 2017.

(Continued)

*Primary Examiner* — Valentina Xavier
(74) *Attorney, Agent, or Firm* — Pearl Cohen Zedek Latzer Baratz LLP

(57) ABSTRACT

A multi-rotor system for providing air thrust is disclosed comprising at least one multi-rotor assembly. The multi-rotor assembly comprising at least two rotors rotatable about a common axis wherein the outer radius of a first rotor, is substantially similar to the inner radius of the second rotor. An airborne vehicle is also disclosed that is adapted to perform vertical takeoff and landing (VTOL). The airborne vehicle comprising at least two multi-rotor system disposed substantially symmetrically around the center of gravity of the vehicle.

11 Claims, 13 Drawing Sheets

(56) References Cited

U.S. PATENT DOCUMENTS

| | | | |
|---|---|---|---|
| 5,454,695 A | 10/1995 | Shah et al. | |
| 8,464,978 B2 * | 6/2013 | Yim | B64C 29/0033 244/17.23 |
| 2005/0067527 A1 | 3/2005 | Petersen | |
| 2006/0226281 A1 | 10/2006 | Walton | |
| 2009/0250549 A1 * | 10/2009 | Wiggerich | B64C 39/028 244/17.11 |
| 2010/0264256 A1 * | 10/2010 | Yim | B64C 27/20 244/17.23 |
| 2016/0311526 A1 | 10/2016 | Geise et al. | |
| 2016/0375983 A1 * | 12/2016 | Yan | A63H 33/005 701/4 |
| 2018/0057135 A1 * | 3/2018 | Yan | A63H 15/06 |
| 2019/0225327 A1 * | 7/2019 | Kidakarn | B64C 27/006 |

FOREIGN PATENT DOCUMENTS

| | | |
|---|---|---|
| CN | 104 787 315 | 7/2015 |
| CN | 104859851 | 8/2015 |
| CN | 105270616 | 1/2016 |
| CN | 205168889 | 4/2016 |
| CN | 205256663 | 5/2016 |
| CN | 105984581 | 10/2016 |
| DE | 20 2005 019243 | 2/2006 |
| GB | 1 386 335 | 3/1975 |
| JP | 2004121798 | 4/2004 |
| WO | WO 2015145101 | 10/2015 |

OTHER PUBLICATIONS

Search Report of European Patent Application No. 17741184 dated Aug. 28, 2019.

Office Action of European Application No. 17741184 dated Oct. 2, 2020.

Office Action of Chinese Application No. 2017800073606 dated Apr. 21, 2021.

Search Report of Application No. 2017800073606 dated Apr. 13, 2021.

* cited by examiner

CROSS SECTION AA

CROSS SECTION BB

SYSTEM, ASSEMBLIES AND METHODS FOR MECHANICAL-THRUST POWER CONVERSION MULTIFANS

CROSS-REFERENCE TO RELATED APPLICATIONS

This application is a National Phase Application of PCT International Application No. PCT/IL2017/050069, International Filing Date Jan. 18, 2017, entitled "System, Assemblies and Methods for Mechanical-Thrust Power Conversion Multifans", published on Jul. 27, 2017 as International Patent Publication No. WO 2017/125923, claiming the benefit of U.S. Provisional Patent Application No. 62/280,762, filed Jan. 20, 2016, all of which are hereby incorporated by reference.

BACKGROUND OF THE INVENTION

Methods and means for providing thrust in fluidic environment such as in the air are known for many years and include various types of propellers, fans, jet engines, rocket engines and the like. Similarly, methods and means for converting flow of fluidic material, such as air, to mechanical/electrical energy are also known for many years and comprise wind turbines, wave/tide energy conversion systems, and the like. Means and methods for providing thrust for an object in air, for providing forward/sideways forces or for providing lift forces, such as in helicopters or similar vertical takeoff and landing (VTOL) vehicles, are also known.

The efficiency of such means and methods may be measured, basically, by the ratio between the resulting effective thrust energy/power and the mechanical/electrical energy/power entered into the converting means. Similarly, in means for converting flow of fluids into mechanical/electrical energy the ratio measuring the efficiency will be between the resulting mechanical/electrical energy/power and the fluids energy/power given to the conversion means.

Typically, reduction of the efficiency may result from mechanical friction, from fluidic turbulences resulting non-consumable energy loss, fluidics energy converted to noise, mechanical vibrations, etc.

Additional efficiency factor may be the efficiency of exploitation of area, space and related physical dimensions. For example, the thrust provided by a propeller or helicopter rotor is different in different areas of the propeller/rotor. FIGS. 1A-1C schematically present helicopter 100 in top and side views and a graph of the helicopter's rotor aerodynamic performance, respectively, as known in the art. Rotor 102 of helicopter 100 may be rotated in a rotation speed that is limited by the tangential speed of the rotor's blade tips, $VR_T$, that should not exceed the speed of sound, and practically not exceed 0.85 of the speed of sound. While the rotor blade tip tangential speed may be close to, and may not exceed the speed of sound, the tangential speed of points along the rotor blade, vary from zero at the axis of rotation, and increases linearly with the radius towards the rotor's blade tip. The aerodynamic efficiency of rotating blades decreases as their linear (=tangential) speed decreases or as their linear speed approaches the speed of sound due to the abrupt change in the density of the air. The area of rotor 102 may be divided, roughly, into two concentric zones 107 and 108. Zone 107 is the external zone, defined between circle 104, depicting the path of the rotor blades' tips and circle 106. Zone 108 is the internal zone defined inside circle 106. As the tangential speed of points along the rotor's blades reduces, the aerodynamic lift of the blade at such points reduces until, at points along circle 106, the lift of the blade there is smaller than the aerodynamic drag produced at that point, as is depicted in FIG. 1C, where graph 110 describe the aerodynamic lift at points along the blade and graph 112 describes the aerodynamic drag produced by the rotor's rotating blades. It may be seen that the drag produced by the rotor's blades is substantially constant with the location along the blade, while the aerodynamic lift drops sharply at points located along circle 106. The efficiency of such thrust producing means may, thus, be defined as the ration of the area usable for producing lift to the total area exploited by the thrust producing means. For example, if the radius of circle 106 is ⅔ of the radius of the blade's tip 104, the Rotor area(s) Efficiency ratio $RE_S$, will be:

$$RE_S = \frac{\pi(R1^2 - R2^2)}{\pi R1^2} = \frac{R1^2 - \left(\frac{2}{3}R1\right)^2}{R1^2} = \frac{5}{9} = 0.55$$

Generally speaking the thrust obtainable from a rotating rotor is proportional to the square of the linear speed of a given part of the rotor's blade, thus the linear speed of the rotor's blades has a large impact on the obtainable thrust of a rotor. Further, noise caused by the rotation of a rotor or a propeller is mainly due to air shear caused by neighboring/adjacent air flows having different air flow speeds. Therefore obtaining a given total thrust from a rotor system where the difference in airspeeds of adjacent airflows is lower will reduce the noise caused by that rotor.

It would be beneficial to improve the rotor area efficiency figure, and even more beneficial to improve this efficiency factor while improving, or at least not diminishing other aspects of the overall performance figures, such as lower self-weight, reduced noise losses, etc. Improvement of the efficiency of a rotor/propeller may also reduce the noise it produces during operation, which mainly results from non-laminar flow induced by the rotor/propeller. Thus, reduction of non-laminar flow of fluid through the rotor/propeller, by means of slowing the speed of the blades' tips, by controlling and directing the fluid's flow before and after the rotor/propeller and the like, may increase the useful thrust while reducing the produced noise.

SUMMARY OF THE INVENTION

A multi-rotor system for providing air thrust is disclosed comprising at least one multi-rotor assembly. The multi-rotor assembly comprising at least two rotors rotatable about a common axis wherein the outer radius of a first rotor, is substantially similar to the inner radius of the second rotor.

According to some embodiments of the invention the multi-rotor system further comprising driving means adapted to rotate each of the rotors in a rotational speed independent of the rotational speed of the other rotors.

According to some embodiments of the invention the at least two rotors are disposed and rotatable in a common plane.

According to some embodiments of the invention the multi-rotor system further comprising duct disposed closely around the outer radius of the out-most rotor and directed with its air flow direction coaxially with the common axis of the multi-rotor system. The multi-rotor system may further comprise at least one additional air duct disposed closely around outer radius of one other rotor.

According to yet additional embodiments an airborne vehicle is disclosed that is adapted to perform vertical takeoff and landing (VTOL). The airborne vehicle comprising at least two multi-rotor system disposed substantially symmetrically around the center of gravity of the vehicle. Each multi-rotor system comprising at least two rotors rotatable about a common axis wherein the outer radius of a first rotor, is substantially similar to the inner radius of the second rotor, and driving means adapted to rotate each of the rotors in a rotational speed independent of the rotational speed of the other rotors.

According to embodiments of the invention the airborne VTOL vehicle is adapted to provide vertical thrust when in takeoff and in landing maneuvering and is further adapted to provide horizontal thrust when in flight maneuvering.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A-7C are schematic illustrations of a coaxial multi-rotors system in top view, in first cross section view and in a second cross section view, respectively, according to embodiments of the present invention;

Figure 1A:
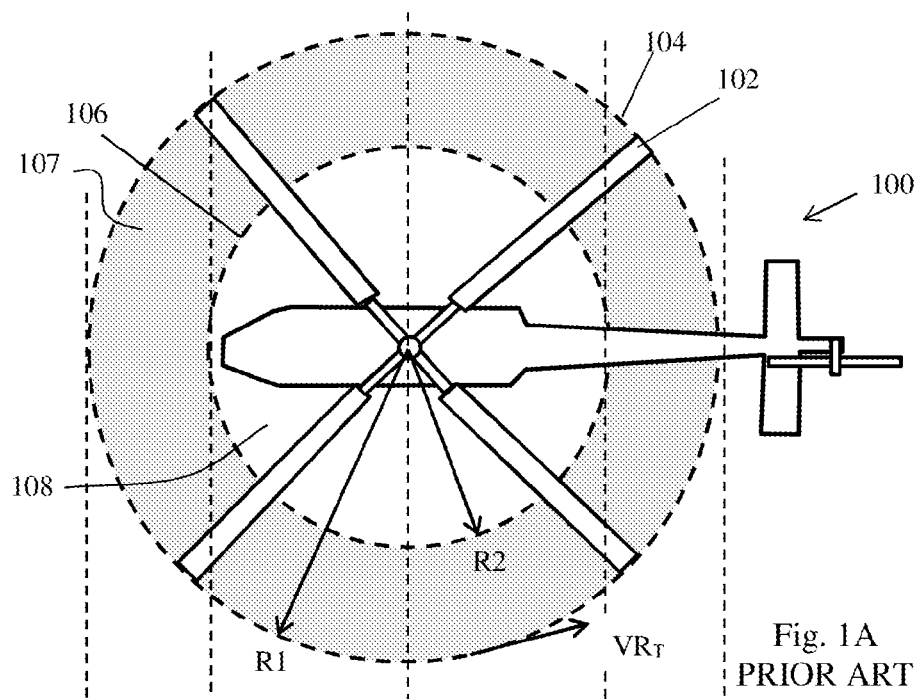
FIGS. 1A-1C schematically present an helicopter in top and side views and a graph of the helicopter's rotor aerodynamic performance, respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2A:
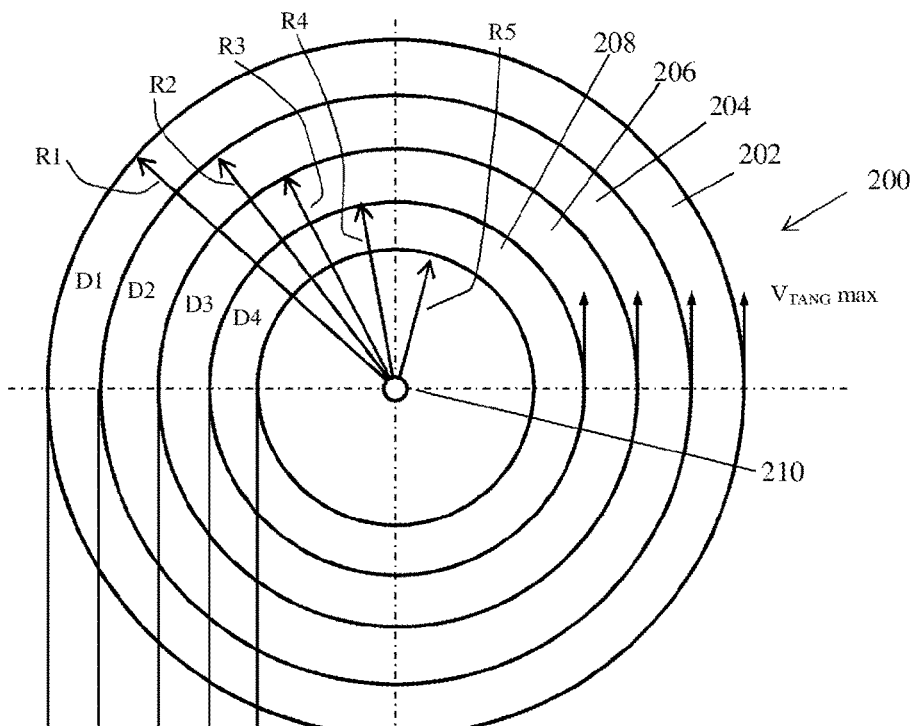
FIGS. 2A and 2B schematically depict a coaxial multi-rotor system and a graph of the rotors' blades velocities of this system, respectively, according to embodiments of the present invention.
Figure 2B:
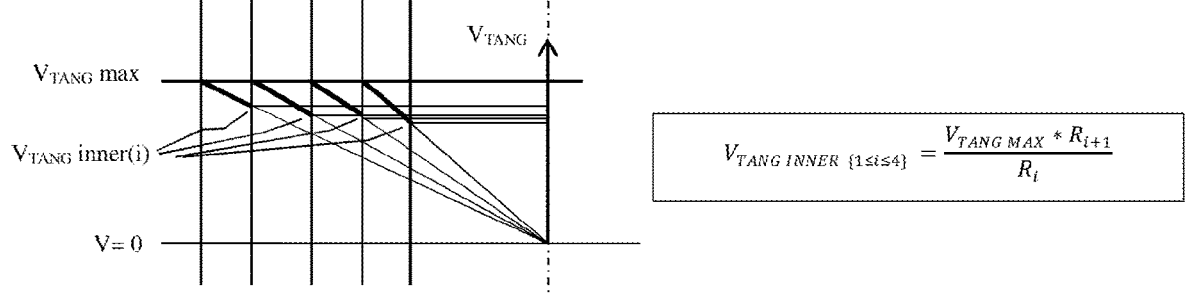

According to embodiments of the present invention two or more concentric rotors or propellers may be assembled, to operate about a common axis, substantially in a common plane, to provide, each, thrust in the same direction. Reference is made to FIGS. 2A and 2B, which schematically depict a coaxial multi-rotor system and a graph of the rotors' blades velocities of this system, respectively, according to embodiments of the present invention. Coaxial multi-rotor system 200 may comprise plurality of rotors 202, 204, 206 and 208 arranged to rotate about a common axis 210. The various rotors are assembled to operate substantially in a common plane in a way that flow through the multi-rotor system will not pass through more than one rotor and the gap between the rotors will be minimal, for example the outer radius of the blades of each rotor is designed to be only slightly shorter than the inner radius of the blades of the neighbor rotor having a longer radius. For example, the outer radius R2 of rotor 204 may be designed to be slightly shorter than the inner radius (not numbered) of rotor 202. This way a substantially continuous coverage of the disk of system 200 is provided by the plurality of rotors, between longest radius R1 and the most inner radius R5. The plurality of rotors may be rotated in different angular speeds. According to embodiments of the present invention the angular speed of each rotor may be that which will rotate the respective rotor blade tip in a tangential $V_{TANG\ MAX}$ speed which may be the maximal practical tangential speed for the operation profile of the rotor system, for example 0.85 of the speed of sound. As depicted in the graph of FIG. 2B, when each of the rotors 202, 204 etc. is set to $V_{TANG\ MAX}$, the tangential speed of the inner end of the blades of the rotors, $V_{TANG\ INNER(i)}$, is different, and is slower as the radius Ri (1<i<5) is shorter. It shall be apparent that according to embodiments of the present invention the specific rotational speeds of the rotors of system 200 may be set otherwise, for example so as to incur rotor's blade tip tangential speed to vary between the rotors, as the functionality of the rotor may dictate.

Figure 1B:
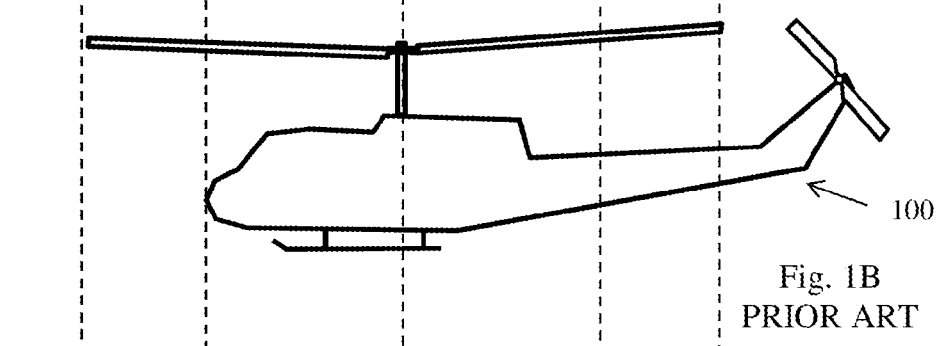
Figure 1C:
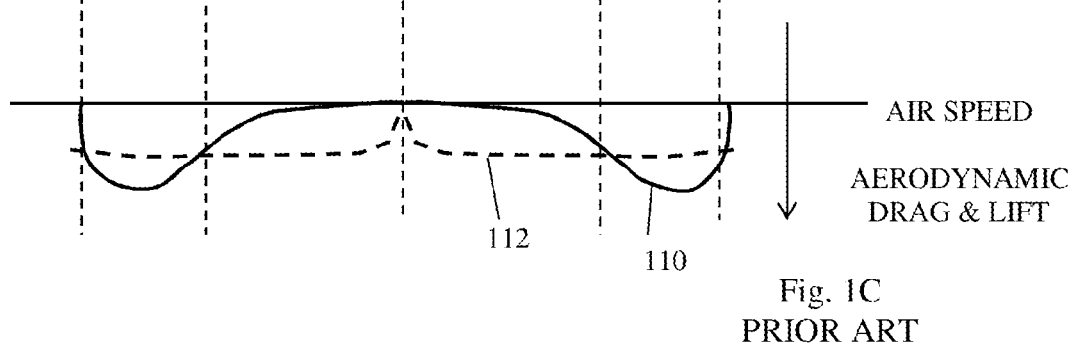

The length of the blades of each of the rotors 202, 204, etc. may be designed to achieve desired overall results. For example, the length of the rotors' blades may be the same for all of the rotors of system 200, for example to provide lower blades production costs. According to other embodiments the specific length of blades of each rotor may be designed to achieve optimal aerodynamic efficiency from rotors system 200. As opposed to a single-rotor system, where a substantial area of the rotor is aerodynamically inefficient, as presented in FIGS. 1A-1C, rotors system 200 presents higher utilization of the area occupied by the rotor. If, for example, in system 200, R5=0.2R1, the Rotor area(s) Efficiency ratio $RE_S$, will be:

$$1-(0.2)^2=0.96$$

Figure 3:
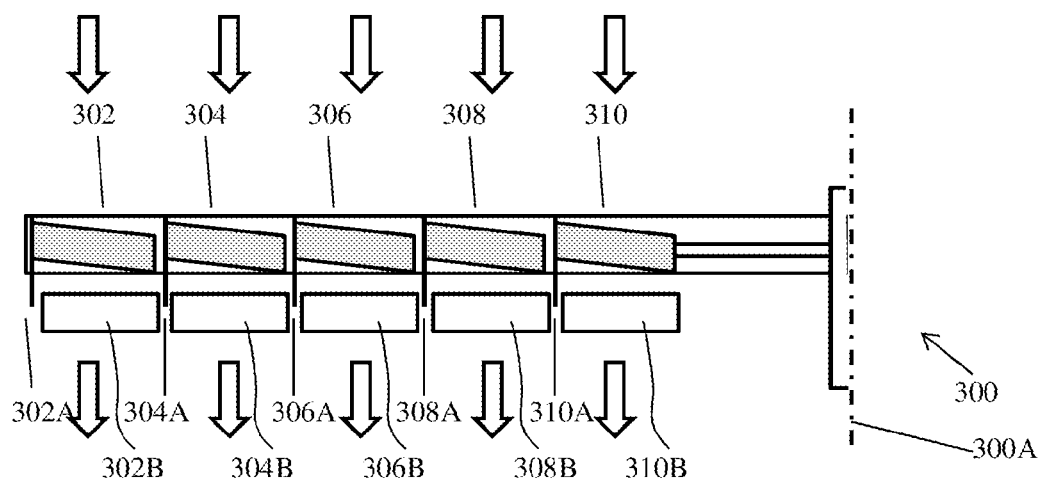
FIG. 3 schematically presents cross section through a coaxial multi-rotor system, showing only the left side of the cross section, which is symmetric about a symmetry line, according to embodiment of the present invention.

Reference is made now to FIG. 3, which schematically presents cross section through a coaxial multi-rotor system 300, showing only the left side of the cross section, which is symmetric about symmetry line 300A, according to embodiment of the present invention. Rotors 302, 304, 306, 308 and 310 may be substantially arranged in a common plane, perpendicular to the rotation axis, coinciding with line 300A. Each of the rotors' blades may have disposed around the outer end of the blades a rotor end ring 302A-310A, respectively, which may provide structural support as well as aerodynamic air directing means, to minimize the rotor's blade-end turbulences and provide improved laminar flow from the specific rotors of system 300. Providing stator flow guides stator structures 302B-310B may also reduce the noise produced by the multi rotor system by means of reduction of turbulences and other sources of noise production such as reduction of zones where flow of air of different velocities and/or different pressure meet each other.

Figure 4:
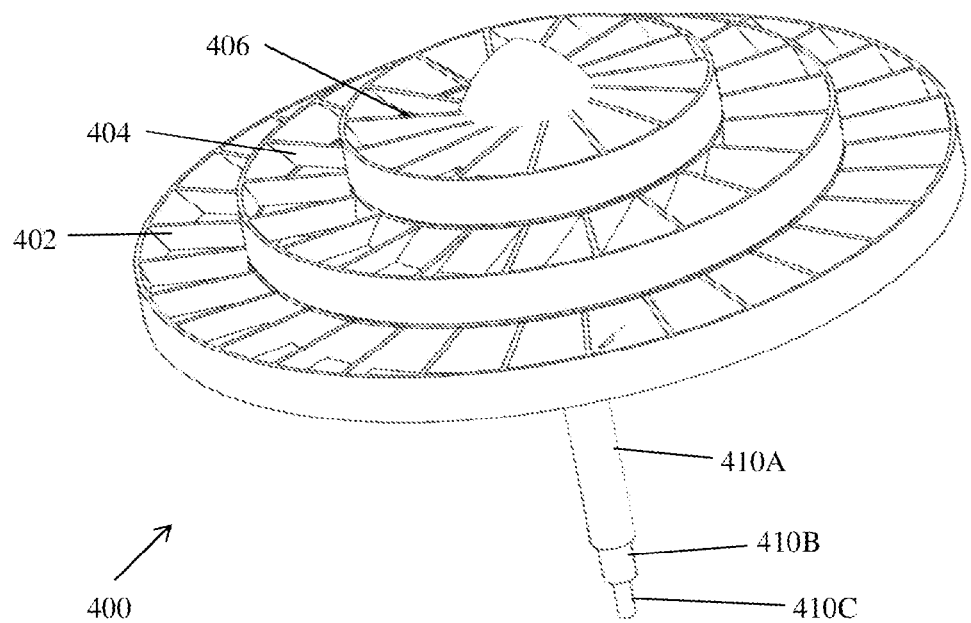
FIG. 4 schematically presents coaxial multi-rotor system according to embodiments of the present invention.

Reference is made now to FIG. 4, which schematically presents coaxial multi-rotor system 400, according to embodiments of the present invention. Rotors system 400 comprises three coaxial rotors 402, 404 and 406 arranged each in a defined plane, the defined planes are perpendicular to the axis of rotation of the rotors. Driving shafts 410A, 410B and 410C, mechanically attached to rotors 402, 404, and 406, respectively, and arranged inside each other. The shafts are tubes, except the most internal one, 410C that optionally can be solid rod. Each shaft attached at one side to rotor, and at the other side to motor or generator.

As discussed above, noise caused by the rotation of a rotor or a propeller is mainly due to air shear caused by neighboring/adjacent air flows having different air flow speeds. Therefore, in multi-rotor systems such as system 300 and system 400, a given total thrust is obtained such that the difference in airspeeds of adjacent airflows is lower compared to a single rotor/propeller providing the same thrust and thus the noise caused by that multi-rotor system is lower.

Figure 5:
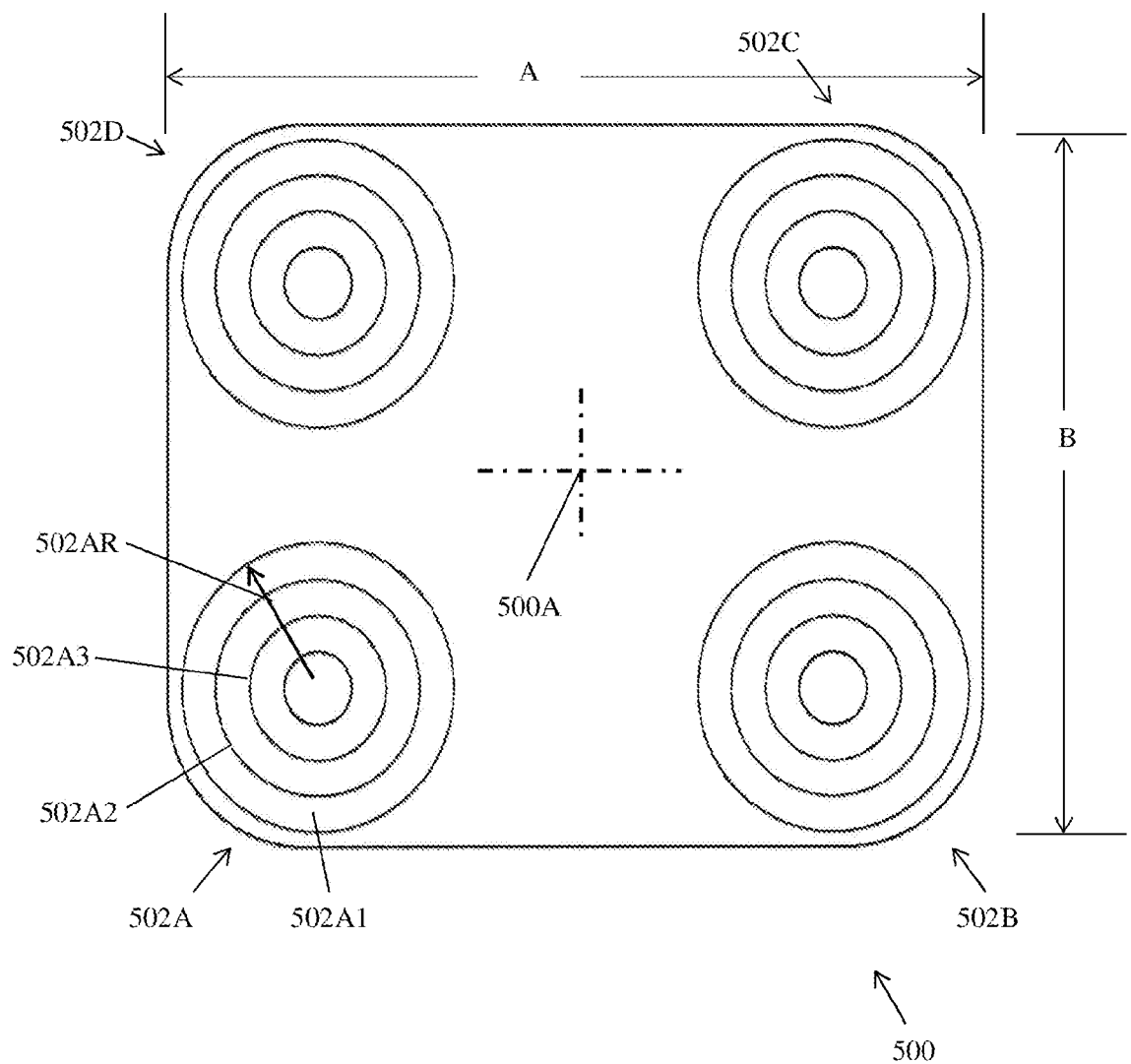
FIG. 5 schematically presents lift system comprising four coaxial multi-rotor systems, each comprising a plurality of coaxial rotors, according to embodiments of the present invention.

In accordance with embodiments of the present invention, and as is presented above, due to improved utilization of the rotors disc overall area, for a required given performance of a rotor (where performance is expressed by the lift force that may be provided by the rotor) a rotor system with outer radius that is substantially shorter than that of a single rotor with similar performance may be used. This provides further benefits, such as improved maneuvering ability due to quicker response to control commands (lower inertia) and due to better ability to operate close to obstacles, as well as operational benefits such as improved potential for mobility of the respective aircraft by other vehicles. According to some embodiments of the present invention, a lift providing system may comprise two or more coaxial multi-rotor systems. Reference is made to FIG. 5, which schematically presents lift system 500 comprising four coaxial multi-rotor systems 502A-502D, each comprising a plurality of coaxial rotors—three in the example of FIG. 5, according to embodiments of the present invention. Multi-rotors systems 502A-502D may be disposed for example symmetrically around center point 500A of lift system 500. The ratio between the outer radius 502AR of the plurality of multi-rotor systems 502A-502D and the outer dimensions A and B of the lift system 500 (in some embodiments A=B) may be designed to meet specific requirements. For example, multi-rotor systems 502A-502D may be disposed closer to each other to provide for smaller overall dimension of the aircraft using lift system 500. In other embodiments multi-rotor systems 502A-502D may be disposed farther from each other to provide for higher maneuvering moments. Lift systems such as system 500, having plurality of multi-rotor systems may also provide higher redundancy factor, which is a desired benefit since each rotor will be able to work independently.

Figure 6:
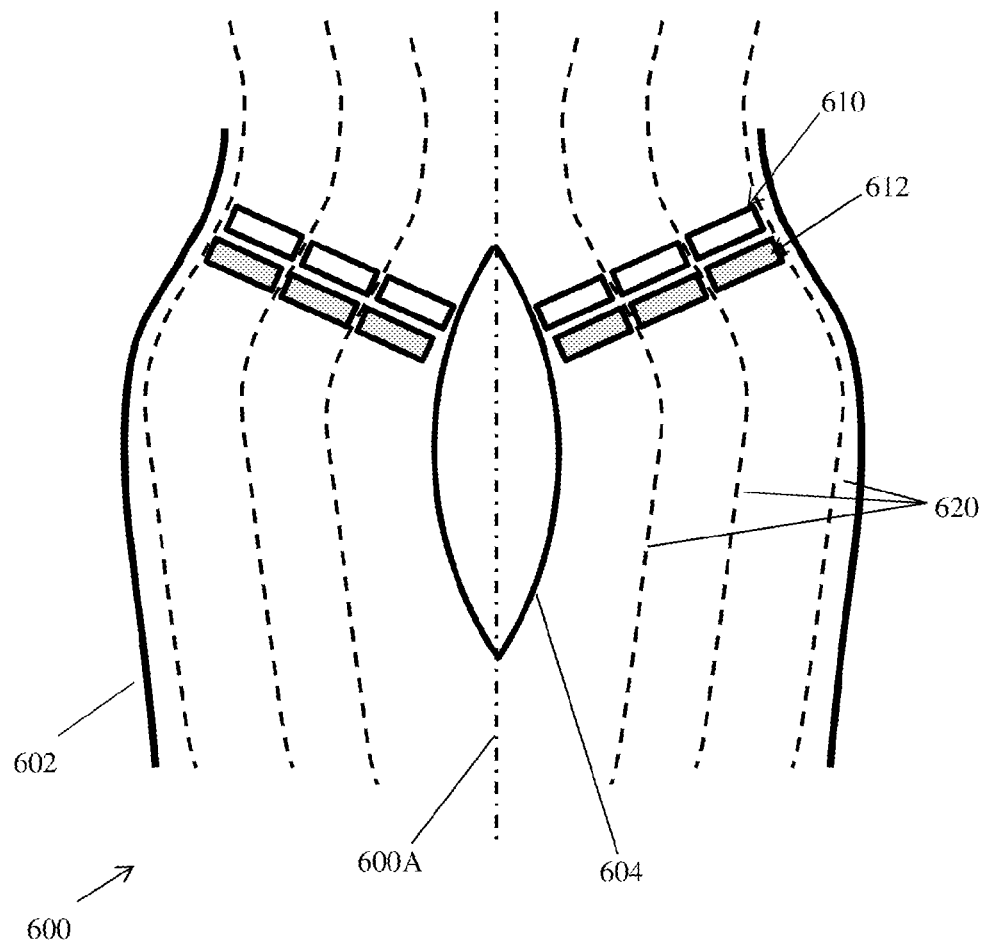
FIG. 6 is a schematic cross section in coaxial multi-rotor system according to embodiments of the present invention.

A multi-rotor system, such as system 200 or 300, may be disposed within, or equipped with an air guiding system which may comprise one or more air ducts and/or one or more air guiding fins, which may be static or moveable to provide changeable guiding angles. Reference is made now to FIG. 6, which is a schematic cross section in coaxial multi-rotor system 600, according to embodiments of the present invention. System 600 may comprise duct 602 comprising multi coaxial rotors 610. Three rotors are drawn in FIG. 6, however it would be apparent that other number of coaxial rotors may be used. Multi-rotor system 610 is disposed within duct 602, which is adapted to guide the air flowing to and from rotor system 610, for example in order to improve the aerodynamic efficiency of system 600, to reduce the noise produced during the operation of system 600, and the like. Multi-rotor system 610 may be configured to provide flow which is not parallel to the axis line (non-axial flow) and may further comprise core element 604 disposed along at least part of the central line 600A of system 600. Core 604 may comprise utilities such as rotational driving means (motors, gearboxes and the like), sensors and the like. According to some embodiments system 600 may further comprise air guiding fins 612 disposed adjacent to multi-rotor system 610 (down the air flow from the multi-rotor system in the drawn example). Air guiding fins 612 may be static or may be adapted to change their angle with respect to the direction the air flow so as to adaptively address changing conditions such as changes the of airspeed through the fins, changes in the turbulences downstream the rotors, etc. Flow lines 620 indicate imaginary lines along duct 602 from the inlet towards its outlet. Internal flow guiding elements may be disposed inside duct 602 to induce, or force improved laminar flow through duct 602. Such flow guiding means may be disposed, for example, along, or parallel to the imaginary flow lines.

Figure 7B:
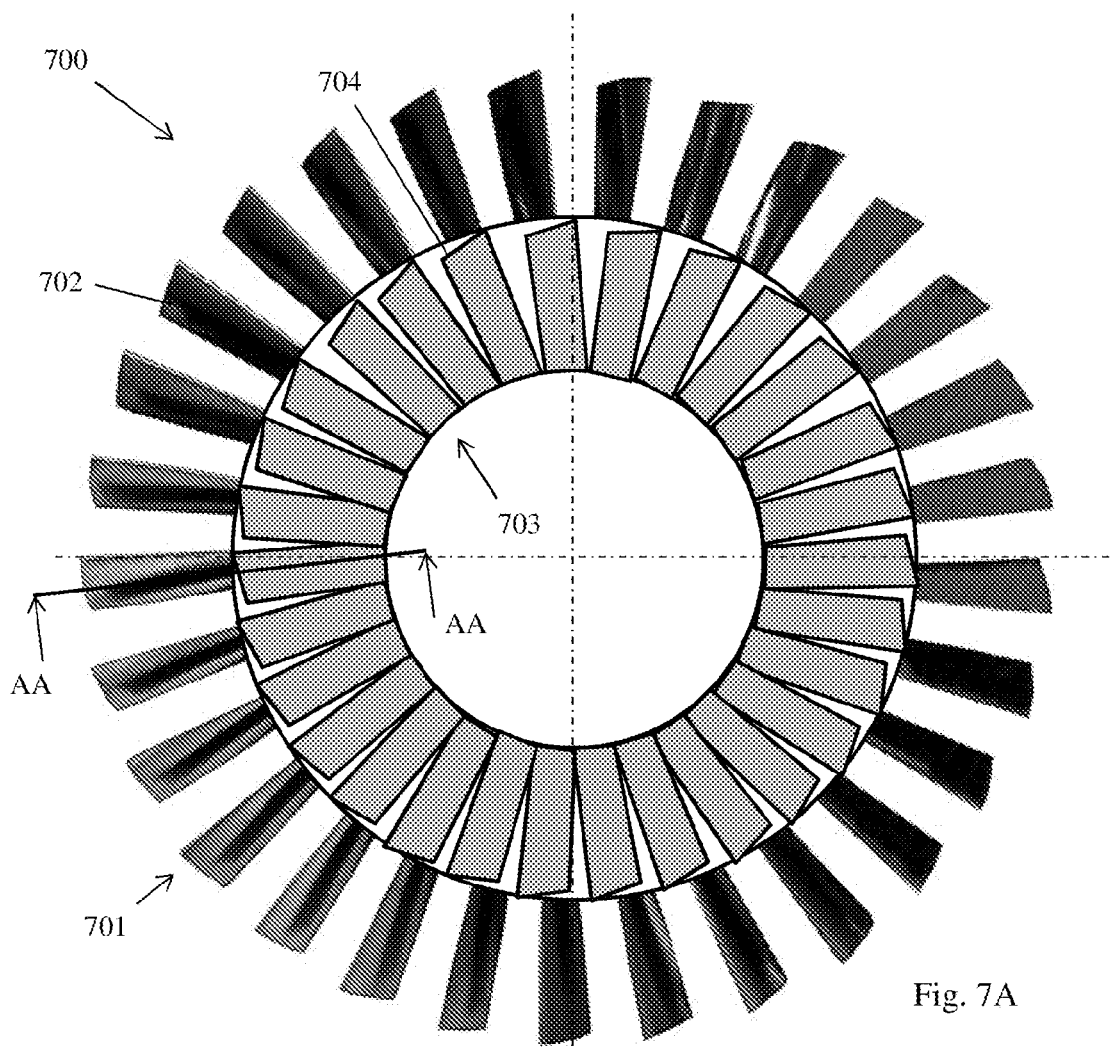
Figure 7B:
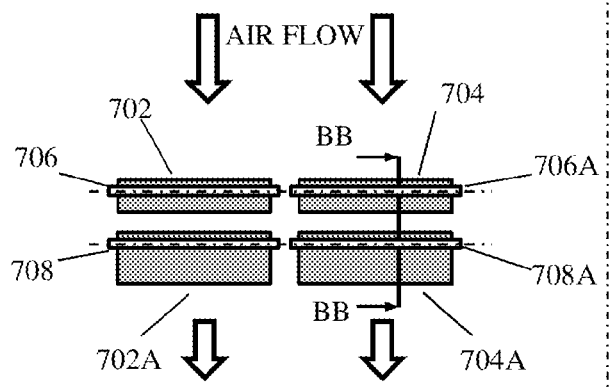
Figure 7C:
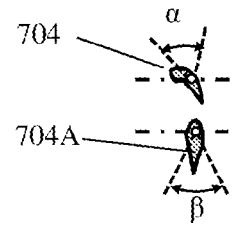

Reference is made now to FIGS. 7A-7C which are schematic illustrations of coaxial multi-rotors system 700 in top view, in first cross section view and in a second cross section view, respectively, according to embodiments of the present invention. Coaxial multi-rotor system 700 comprises two coaxial rotors 701 and 703, disposed substantially in a common plane wherein the outer radius of inner rotor 703 is slightly shorter than the inner radius of outer rotor 701. Rotor 701 comprises a plurality of rotating blades 702 and stator fins 702A. Rotor 703 comprises a plurality of rotating blades 704 and stator guiding fins 704A. Airflow induced through rotors' blades 702 or 704 due to the rotation of each of the rotors, passes over the respective guiding fins 702A and 704A, respectively. Each of blades 702 and 704 may structurally be connected to the rotors' circumferential support rings via one or more structure means 706 and 706A, respectively. In embodiments of the invention where the angle of attack of the rotors' blades may be controlled, support means 706 and 706A may provide both structural support and means for changing the angle of attack. Change in the angle of attack of the rotors' blades may be required in order to optimize the rotors' performance in changing operation conditions. In some embodiments of the present invention the angle of attack of each of the rotors' blades may be within the range of a expressed, for example, in degrees. In a similar manner air guiding fins 702A and 704A may structurally be supported by at least one support means 708 and 708A, respectively. In embodiments where the angle of attack (or angle of air flow directing) is controllable support means 708 and 708A may also be used for changing the angle of attack of the stator air guiding fins 702A and 704A. In some embodiments of the present invention the angle of attack of each of the stators' guiding fins may be within the range of $\beta$ degrees.

Stators disposed downstream of the rotor, as are stators 702A and 704A may be adapted to straighten helical flow coming out of the rotor and make it more linear and thus enable extraction of extended thrust from that flow. Additionally or alternatively guiding fins such as fins 702A and/or 704A may be used to deviate the direction of flow and thereby change the direction of thrust.

Each of the rotors, or propellers, in the multi-rotor systems may be powered, or rotated by means of any known device(s) capable of providing rotational power, such as electrical motor or motors, internal combustion engine and corresponding gearbox(es), turbo-jet engine and corresponding gearbox(es), and the like. When silent operation is of essence electrical motors will be selected, provided that the performance of the electrical power package—electrical power source and the electrical motors—will be sufficient. Sufficiency of the electrical power package may be assessed by the ratio of self-weight to total operational weight of the device using this electrical power package, and/or the service time of the electrical power package between consecutive re-charge cycles, and the like.

Since high figure of total operational weight to self-weight of the power package is of essence Halbach-Array Electrical Motor (HAEM) arrangement may be used to achieve high power with lesser self-weight. Reference is made now to FIGS. 8A-8D, which schematically present various mechanical arrangements 800A-800D respectively, of powering multi-rotor systems using electric motors, for example HAEM arrangements, according to embodiments of the present invention. It will be apparent to those skilled in the art that other powering arrangements may be used for powering similar or identical assemblies of rotors. The various powering solutions for providing rotational drive to the common-axis, different rotor assemblies are designed for example so that the power will be provided to each of the rotors independently to provide maximum redundancy and in a way that power provided to one rotor will incur minimal disturbances to the operation of that rotor and the other rotors (e.g. interference with the air flow to/from the rotors, etc.). Each powering unit is designed to provide the required power, the required rotational speed, the required torque and the required controllability of those parameters.

Figure 8A:
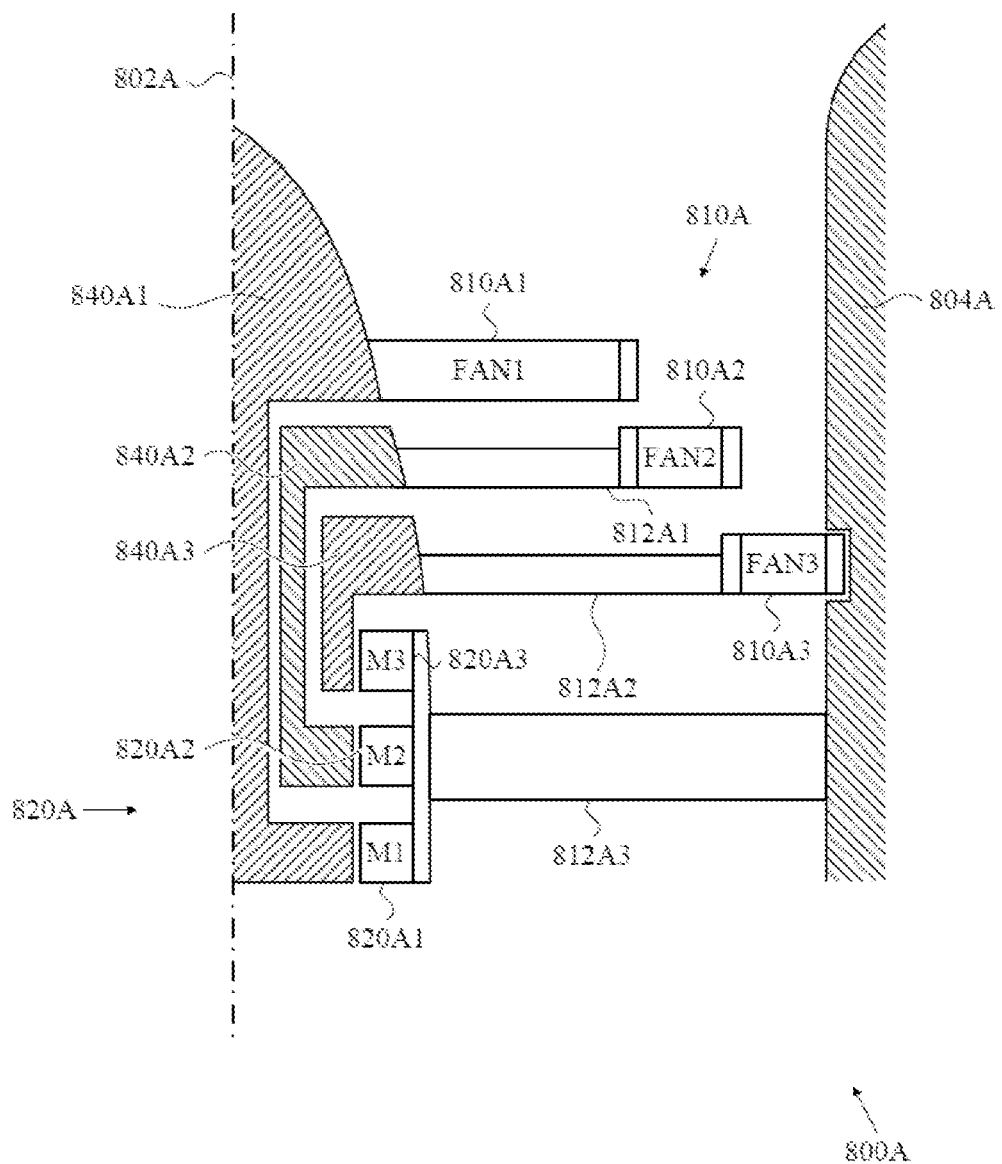
FIGS. 8A-8D schematically present various mechanical arrangements of powering multi-rotor systems using electric motors, according to embodiments of the present invention.

Reference is made now to FIG. 8A, which schematically depicts a multi-rotor system 800A shown in schematic half symmetric cross section, according to embodiment of the present invention. System 800A comprises powering system 820A for providing power to each of the common-axis different rotor length rotor system 810A. Multi-rotor system 800A may comprise two or more common-axis different-rotor-length rotors 810A1, 810A2 and 810A3, arranged one below the other down the flow direction of air through them rotatable about common axis 802A within air duct 804A. First rotor 810A1 may be suspended by shaft 840A1 which may be the innermost shaft. Shaft 840A1 may be driven by motor 820A1 which may be positioned near common axis 802A and lower of motors 820A2 and 820A3 as is described herein below. Second rotor 810A2 may be suspended by suspension assembly 812A1 to second driving shaft 840A2. Suspension assembly 812A1 may be formed as a stator for the air flow from first rotor 810A1, or may be formed as a simple suspension, having minimal drag, and connecting second rotor 810A2 to its respective driving shaft 840A2. Shaft 840A2 may be formed to rotate external to and about inner most shaft 840A1. Second driving shaft 840A2 may be driven by second motor 820A2, which may be positioned near common axis 802A and upper of motor 820A1 and lower of motor 820A3. Similarly, third rotor 810A3 may be suspended by suspension assembly 812A2 to third driving shaft 840A3. Suspension assembly 812A2 may be formed as a stator for the air flow from first rotor 810A and second rotor 810A2, or may be formed as a simple suspension connecting third rotor 810A3 to its respective driving shaft 840A3. Shaft 840A3 may be formed to rotate external to and about shaft 840A2. Third driving shaft 840A3 may be driven by third motor 820A3, which may be positioned near common axis 802A and upper of motors 820A1 820A2 with respect to the direction of air flow. As seen in FIG. 8A all three motors 820A1-820A3 may be positioned nearby common axis 802A and may be suspended by a single suspension assembly 812A3 which attached to air duct 804A. Suspension assembly 812A3 may be formed, according to embodiments of the invention, as a stator to regulate airflow downstream of rotors 810A1-810A3. According to embodiments of the invention two of, or all three motors 820A1-820A3 may be identical thus providing cheaper and simpler driving solution. Additionally, the driving solution of FIG. 8A enables use of small diameter bearings which typically cheaper and having longer life relative to large diameter bearings. The motors structure of FIG. 8A allow for simpler sealing of the motors and shafts, to protect for example against dust and moisture.

In some embodiments more than one duct may be disposed. For example, for rotor 810A1, and/or for rotor 810A2 and/or for rotor 810A3 a separate duct may be provided (not shown in FIG. 8A), thereby regulation of the airflow down stream of rotors 810A1, 810A2 and 810A3 may be improved. In yet additional embodiments the cross section area of each such duct may be changed along the axial direction, e.g, the cross section area of each duct may be reduced downstream of the flow, or—in another embodiment—it may be increased, as the specific intended use may dictate.

Figure 8B:
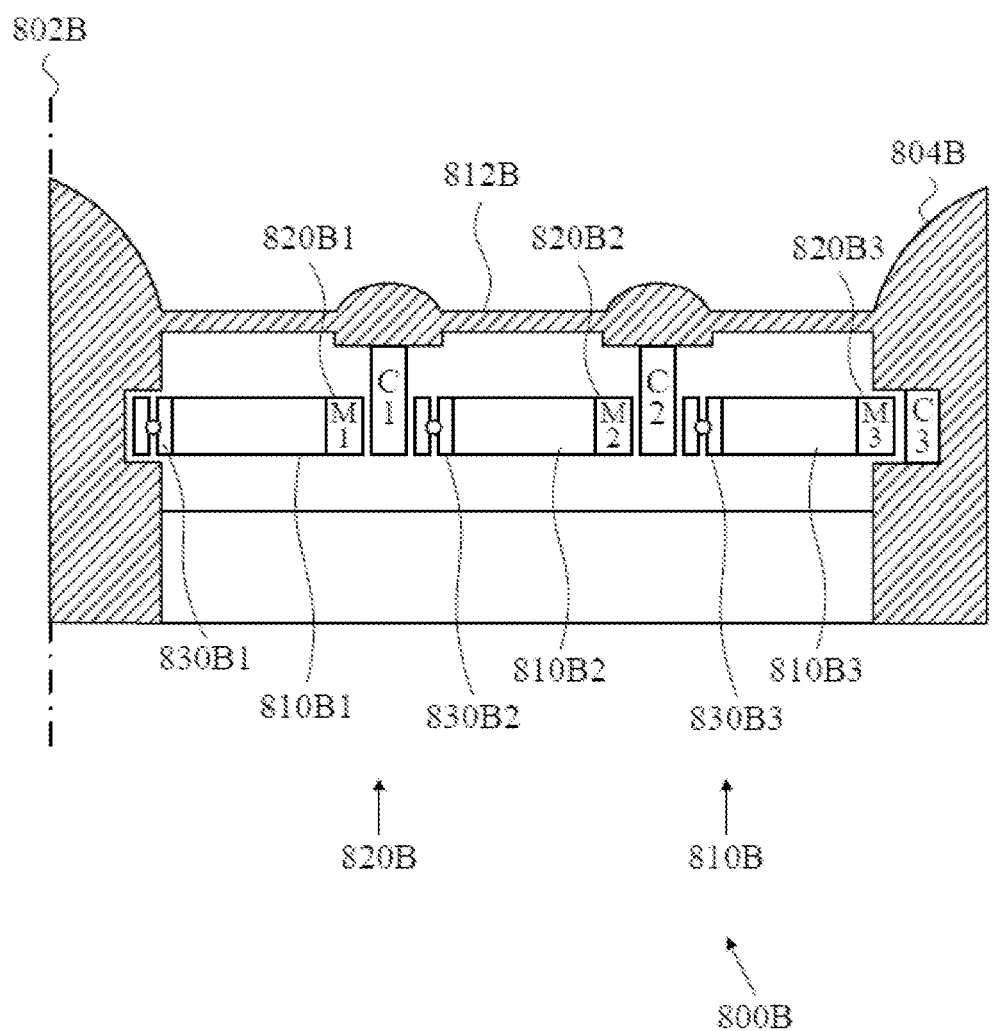

Reference is made now to FIG. 8B, which schematically depicts a multi-rotor system 800B shown in schematic half symmetric cross section, according to embodiment of the present invention. System 800B comprises powering system 820B for providing power to each of the rotors of common-axis different rotor length rotor system 810B. Multi-rotor system 800B may comprise two or more common-axis different-rotor-length rotors 810B1, 810B2 and 810B3, arranged substantially in a common plane perpendicular to the flow direction of air through them and rotatable about common Imaginary axis 802B within air duct 804B. First and inner-most rotor 810B1 may be suspended by first bearing 830B1 which may be installed in the inner portion of air duct 804B. rotor 810B1 may be driven directly by motor 820B1 which may be, for example, a Halbach type electrical motor disposed around the outer circumference of first rotor 810B1. The stator portion of first motor 820B1 that typically contain electric coil, may be suspended by suspension bridge 812B which may also suspend second bearing 830B2, located at the outer circumference of first motor 820B1. Second rotor 810B2 may be suspended by second bearing 830B2 and may be driven by second motor 820B2. Second motor 820B2 may also be, for example, a brushless motor such as for example Halbach type electrical motor disposed around the outer circumference of second rotor 810B2. The stator portion of second motor 820B2 may be suspended by suspension bridge 812B which may also suspend third bearing 830B3, located at the outer circumference of second motor 820B2. Third rotor 810B3 may be suspended by third bearing 830B3 and may be driven by third motor 820B3. Third motor 820B3 may also be, for example, a Halbach type electrical motor disposed around the outer circumference of third rotor 810B3. The stator portion of third motor 820B3 may be suspended by the outer portion of air duct 804B. according to the embodiment depicted in FIG. 8B the bearing of each rotor is located at the smaller dimension of that rotor while the respective motor is located at the outer circumference of that rotor thus capable of providing higher driving moment to its rotor. Additionally, a single and thereby simpler suspension arrangement is required, with minimal interruption by the motors to the air flow and large space left for providing stators if required downstream of the rotors (not shown). The arrangement of FIG. 8B additionally provides compact positioning of the rotors, motors and bearings, thus allowing installation in small available spaces.

Figure 8C:
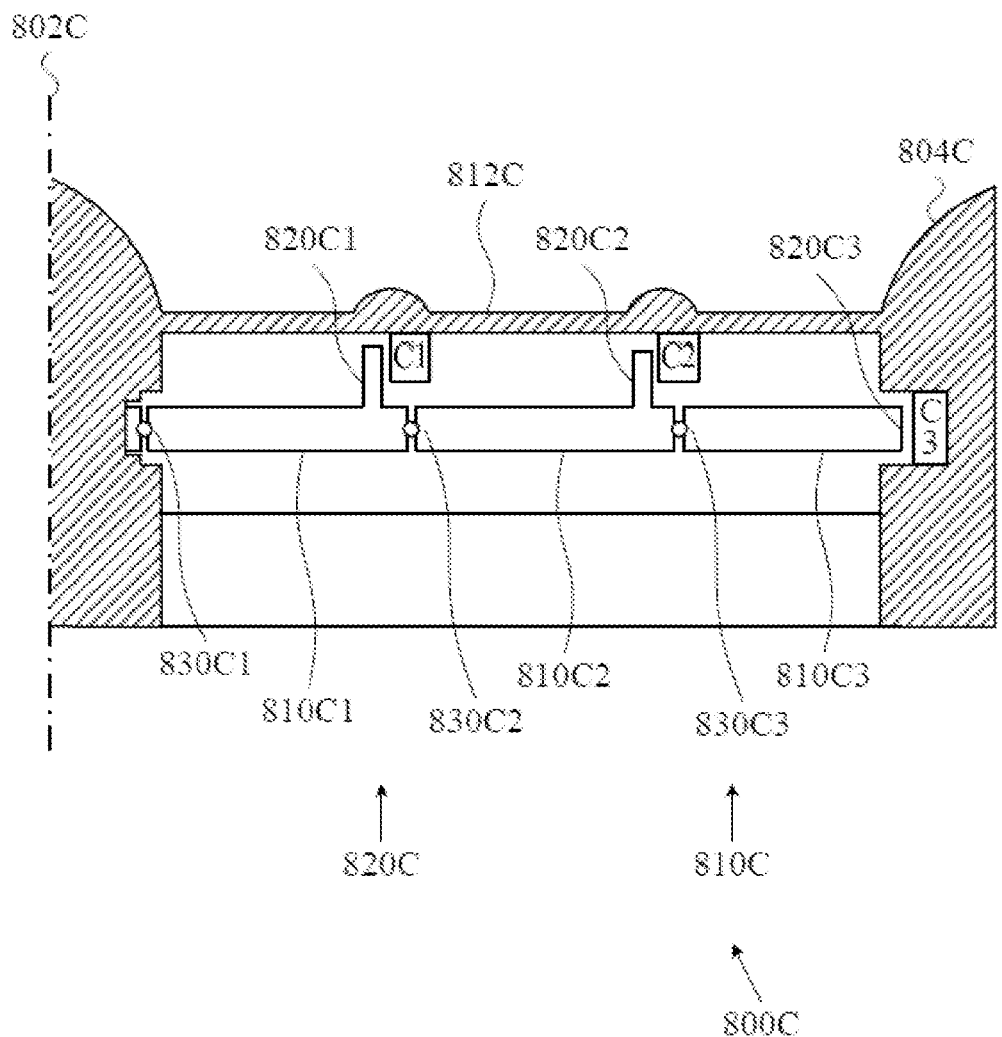

Reference is made now to FIG. 8C, which schematically depicts a multi-rotor system 800C shown in schematic half symmetric cross section, according to embodiment of the present invention. System 800C comprises powering system 820C for providing power to each of the rotors of common-axis different rotor length rotor system 810C. Multi-rotor system 800C may comprise two or more common-axis different-rotor-length rotors 810C1, 810C2 and 810C3, arranged substantially in a common plane perpendicular to the flow direction of air through them and rotatable about common Imaginary axis 802C within air duct 804C. First and inner-most rotor 810C1 may be suspended by first bearing 830C1 which may be installed in the inner portion of air duct 804C. Rotor 810C1 may be driven directly by motor 820C1 which may be, for example, a Halbach type electrical motor the rotating portion of which may be disposed adjacent the outer circumference of first rotor 810C1. The stator portion of first motor 820C1 suspended by suspension bridge 812C. Suspension bridge 812C may extend between the inner portion and the outer portion of air duct 804C, comprising two or more radial elements. Second bearing 830C2 may be disposed around the outer circumference of first rotor 810C1. Second rotor 810C2 may be suspended by second bearing 830C2 and may be driven by second motor 820C2. Second motor 820C2 may also be, for example, a Halbach type electrical motor the rotating portion of which may be disposed adjacent the outer circumference of first rotor 810C2. The stator portion of second motor 820C2 may be suspended by suspension bridge 812C. Third rotor 810C3 may be suspended by third bearing 830C3 and may be driven by third motor 820C3. The inner portion of third bearing 830C3 may be disposed around the outer circumference of second rotor 810C2. Third motor 820C3 may also be, for example, a Halbach type electrical motor the rotating portion of which may be disposed adjacent the outer circumference of third rotor 810C3. The stator portion of third motor 820C3 may be suspended by the outer portion of air duct 804C. According to the embodiment depicted in FIG. 8C the bearing of each rotor is located at the smaller possible dimension of that rotor while the respective motor is located at the outer circumference of that rotor thus capable of providing higher driving moment to its rotor. Additionally, a single and thereby simpler suspension arrangement is required, with minimal interruption by the motors to the air flow and large space left for providing stators if required downstream of the rotors (not shown). The arrangement of FIG. 8C additionally provides compact positioning of the rotors, motors and bearings, thus allowing installation in small available spaces. Further, since bearings 830C2 and 830C3 are installed at their inner ring, on the outer circumference of rotor 810C1 and 810C2, respectively, the actual difference between the rotation speeds of the inner and the outer rings of each of these bearing is merely the difference in the rotational speeds of the respective pairs of rotors 810C1-810C2 and 810C2-810C3 and thereby are subject to reduced wear and long life.

Figure 8D:
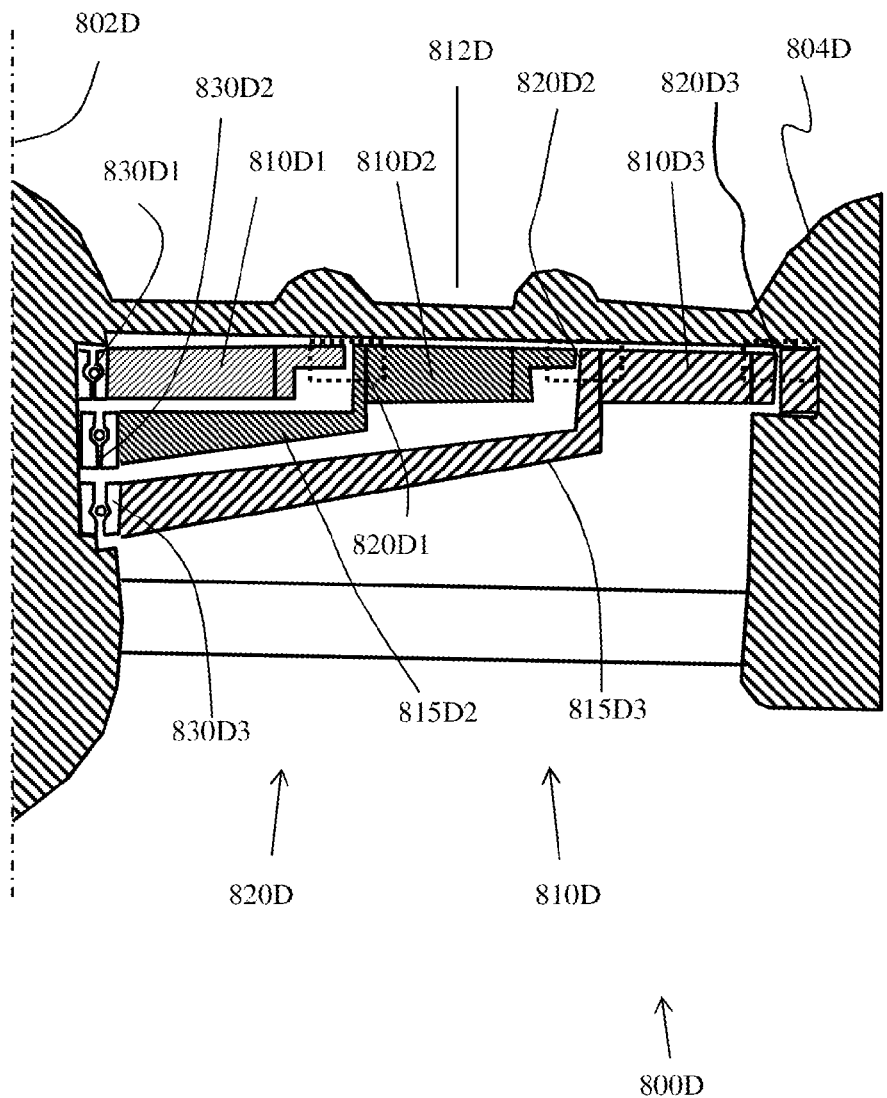

Reference is made now to FIG. 8D, which schematically depicts a multi-rotor system 800D shown in schematic half symmetric cross section, according to embodiment of the present invention. System 800D comprises powering system 820D for providing power to each of the rotors of common-axis different rotor length rotor system 810D. Multi-rotor system 800D may comprise two or more common-axis different-rotor-length rotors 810D1, 810D2 and 810D3, arranged substantially in a common plane perpendicular to the flow direction of air through them and rotatable about common Imaginary axis 802D within air duct 804C. Common-axis different rotor length rotor system 810D may be disposed within air duct 804D. First and inner-most rotor 810D1 may be suspended, via bearing 830D1 directly by the inner portion of air duct 804D. Second rotor 810D2 may be suspended onto bearing 830D2 via two or more suspension arms 815D2, and bearing 830D2 may be disposed similar and adjacent to bearing 830D1 on the inner part of air duct 804D. Third rotor 810D3 may be suspended onto bearing 830D3 via two or more suspension arms 815D3, and bearing 830D3 may be disposed similar and adjacent to bearing 830D1 on the inner part of air duct 804D. First rotor 810D1 may be driven directly by motor 820D1 which may be, for example, a Halbach type electrical motor, the inner rotating portion of which may be disposed adjacent the outer circumference of first rotor 810D1. The outer rotating portion of motor 820D1 may be disposed on the inner circumference of second rotor 810D2. Second rotor 810D2 may be driven directly by motor 820D2 which may be, for example, a Halbach type electrical motor, the inner rotating portion of which may be disposed adjacent the outer circumference of second rotor 810D2. The outer rotating portion of motor 820D2 may be disposed on the inner circumference of second rotor 810D3. Third rotor 810D3 may be driven directly by motor 820D3 which may be, for example, a Halbach type electrical motor, the inner rotating portion of which may be disposed adjacent the outer circumference of third rotor 810D3. The outer portion of motor 820D3 may be disposed on the inner face of the outer portion of air duct 804D. According to the embodiment depicted in FIG. 8D the bearing of all of the rotors are located near the central rotation axis thus enabling use of bearings with small diameter which in turn has technical advantages (easy to install, to protect and seal and reduced wear) as well as commercial advantages (lower cost). At least some of the rotating elements, such as rotors, and suspension arms may be made of light-weight and strong composite materials such as Carbon reinforced Polyether ether ketone (PEEK) or epoxy resin based composite materials. Such non-metallic materials have also the benefit of not presenting disturbances to the magnetic field of the electric motors.

According to embodiments of the invention when low noise produced by a multi-rotor system is of essence electrical motors may be used, as mentioned above with respect to the embodiments depicted in FIGS. 8A-8D. Further, stators and other air guiding means may be used to smooth the air flow to and from the rotors and to minimize turbulences and other air flow induced noises. In other embodiments other driving means may be used such as internal combustion engine(s), turbo-fan jet engines and the like. The selection of the driving means may be done to meet the specific requirements of the multi-rotor system. For example, turbo-fan jet engine driving means may provide improved combination of thrust-to-weight figure combined with time/service range figure, with relatively high noise figure while electrical motors may provide silent driving means with lower thrust-to-net service weight figure and lower time and range service figure.

Figure 9A:
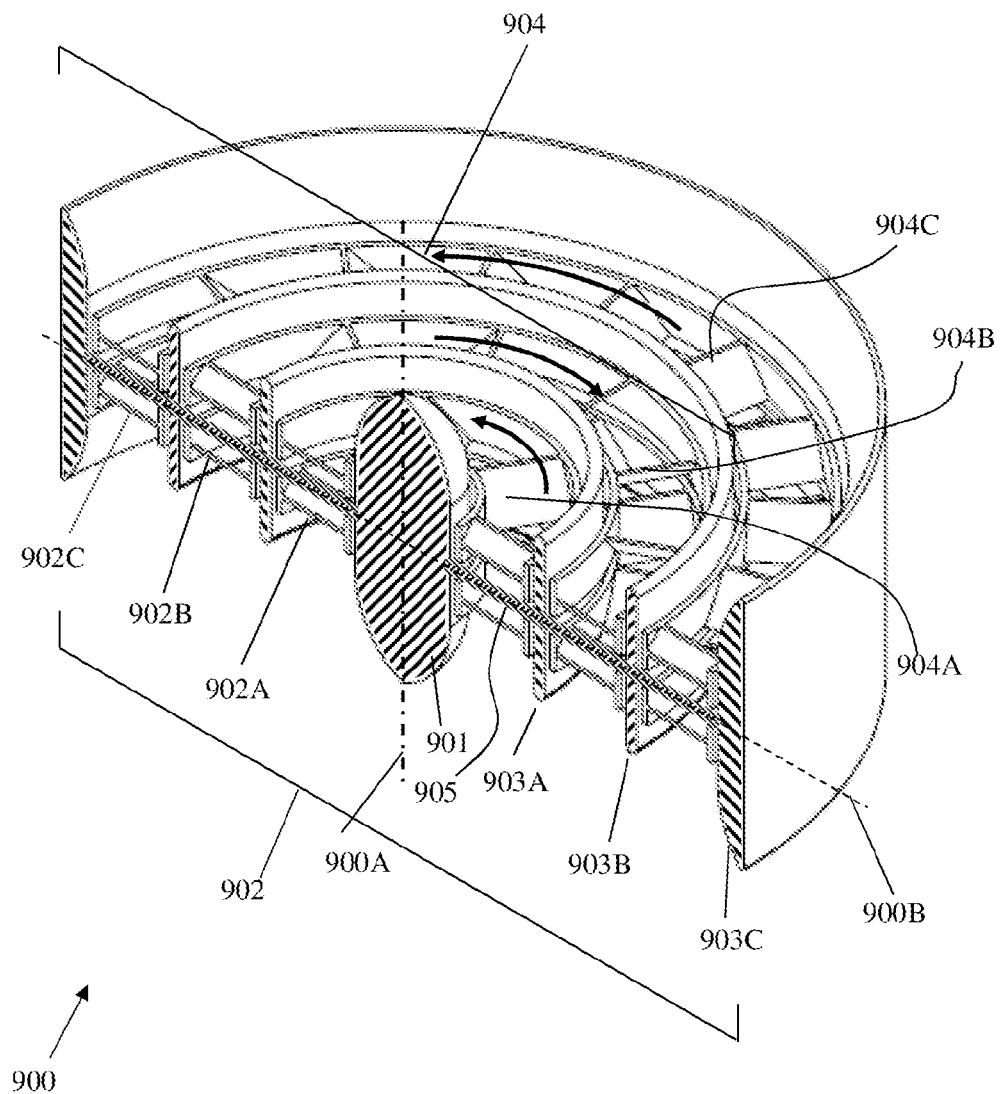
FIGS. 9A and 9B are schematic cross section of an isometric view and a front view of a cross section, respectively, of a multi-rotor system according to embodiments of the present invention.
Figure 9B:
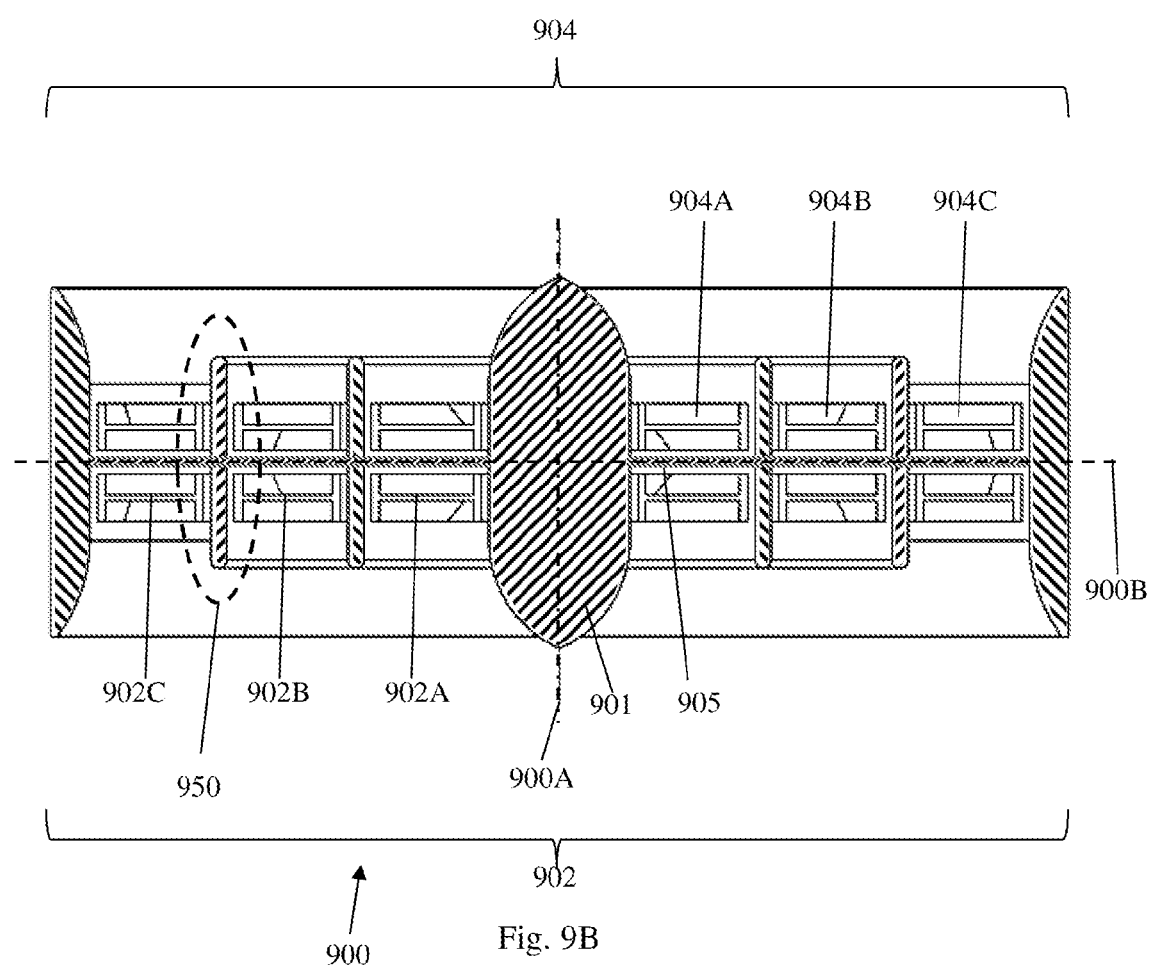

According to some embodiments of the present invention multi-rotor system may comprise plurality of concentric rotors arranged in more than one plane or layers. Reference is made to FIGS. 9A and 9B which are schematic cross section of isometric view and front view of the cross section, respectively, of multi-rotor system 900 according to embodiments of the present invention. Multi-rotor multi-layer system 900 comprise at least two concentric multi-rotor units (CMRU) disposed axially with respect to each other, lower CMRU 902 and upper CMRU 904, arranged about a common rotation axis 900A. Each of CMRU 902 and 904 comprise plurality of substantially co-planar and coaxial rotors disposed radially with respect to each other, three in the example of FIGS. 9A and 9B, rotors 902A-902C in the lower CMRU and rotors 904A-904C in the upper CMRU. Between the outer edges of the blades of each rotor and the inner edges of the blades of the rotor that is external to it, there may be disposed a duct, such as ducts 903A between rotors 902A/902B and rotors 904A/904B, respectively, and the like. Ducts 903A-903C may be structurally supported by radial structure supports 905. Rotors 902A-902C and 904A-904C may be pivotally connected to the structure of multi-rotor system 900 via circumferential bearings and may be powered for rotation by electrical motors such as Halbach-Array Electrical Motor (HAEM), as explained in details above. Each rotor may be rotated by a different motor. Each stator of each motor may be attached to a non-rotating structure, for example the duct or the hub 901. The duct may therefore provide support for a stator of a HAEM on its inner face and support for bearing on its outer face, as explained above, for example with respect to the area of duct 903B marked 950 in FIG. 9B.

Figure 9C:
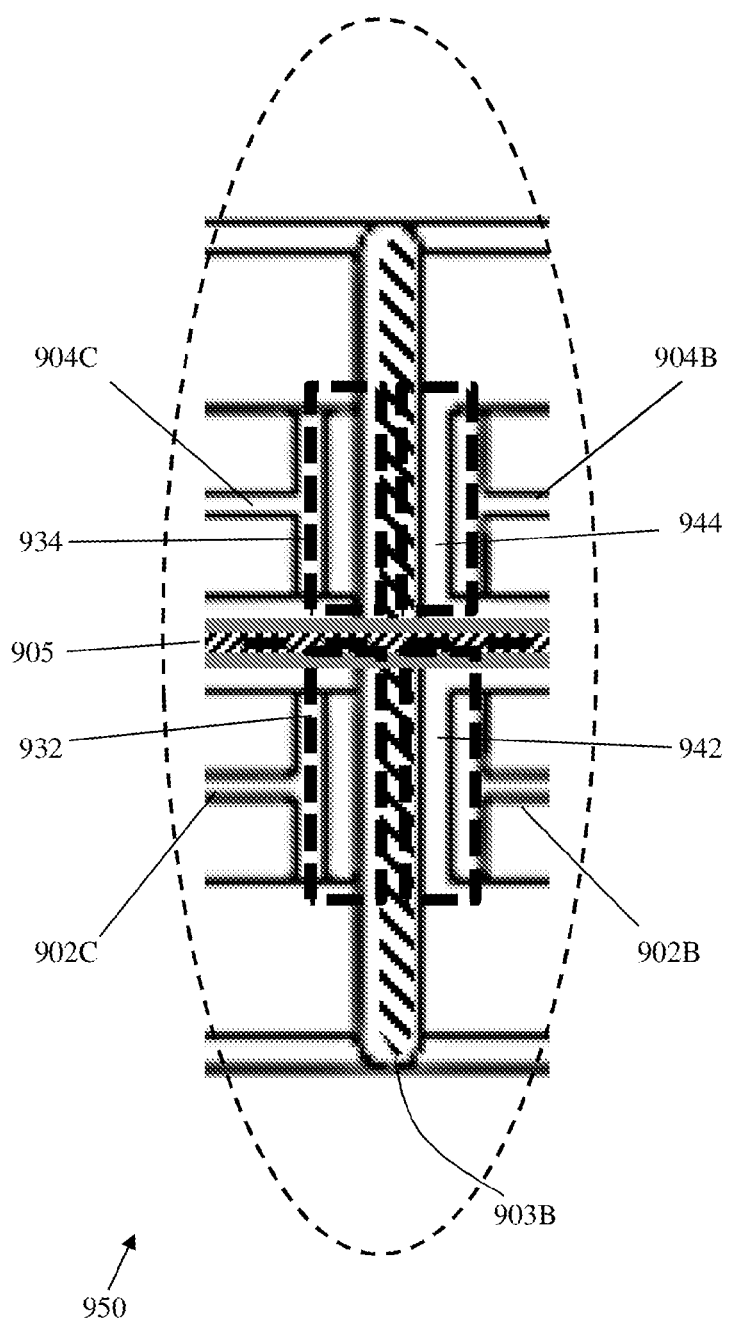
FIG. 9C is an enlarged view of certain details in FIG. 9B according to embodiments of the present invention.

Reference is made to FIG. 9C that is schematically showing enlarged view of details 950 of FIG. 9B, according to embodiments of the present invention. On the right (i.e. inner) side of duct 903B a stator of a HAEM may be disposed in area 942 for powering the set of rotating magnets on rotor 902B and a stator of a HAEM may be disposed in area 944 for powering the set of rotating magnets on rotor 904B. On the left (i.e. outer) side of duct 903B a first (inner) part of a bearing may be disposed in area 932 for providing pivotal support for rotor 902C and a first (inner) part of a bearing may be disposed in area 934 for providing pivotal support for rotor 904C.

According to some embodiments the direction of rotation of each of the rotors in each plane may be CW and CCW alternately, as depicted by the arrows in FIG. 9A. Further, the direction of rotation of pairs of lower and upper rotors may be opposite to each other for maximizing the efficiency of the system.

The arrangement described with respect to FIGS. 9A-9C was found to provide much higher aerodynamic thrust from a given area of rotor compared to a single rotor with the same rotor area.

Selection of the internal and external radius of each of the rotors may be done based on calculations lead by one or more from: substantially same provided power to each rotor, common area for all of the rotors, same received thrust from the rotors and substantially same provided driving moment to each of the rotors.

According to embodiments of the present invention improved redundancy may be achieved with separate rotational power source/driving means for each rotor and separate power control means for each rotor. Alternatively, one control unit and one driving means may be used to drive a single rotor in each multi-rotor system in the vehicle.

According to embodiments of the present invention a plurality of sensors may be provided and disposed with the multi-rotor system. These sensors may be adapted to provide indications of one or more of the following parameters: rotational speed of the rotor, moment provided to the rotor, thrust force produced by each rotor, motors temperature, electric power entering each motor, air flow speed via the rotors, rotor system vibrations (magnitude and frequency) in at least one dimension (and preferably in three linear dimensions and three rotational dimensions) and noise sensor. These physical parameters may be measured or otherwise be sampled or presented to a control unit or for observation by a user by any known means or methods. For example, the rotational speed and rotation direction of the rotor may be measured using measuring means relying on the back EMF phenomena. The moment provided to the rotor may be measured, for example, by measuring the magnitude of axial torque of a shaft used to provide this moment. The deployment of such sensors may be maximal, i.e. sensors to measure or reflect all of the measurable parameters of every rotor in every multi-rotor system, or may be less than that, as may be dictated by the planned usage.

Noise sensor(s) may be used to evaluate the aerodynamic finite efficiency of the mechanical moment-to-air thrust conversion state. It is known that noise stemming from flow turbulences represents, among other aspects, energy invested in causing turbulences in the fluid (e.g. air). Forming turbulences represents energy invested in non-laminar flow, which is the origin for thrust produced in a fluid environment. Thus, reduction of noise representative of flow turbulences is expected to increase the mechanical moment-to-air thrust conversion efficiency figure. In order to reduce flow noise one or more of the following variables may be controlled: rotor rotation speed, rotor blades angle of attack, stator fins angle of attack, shape of the flow (e.g. air) duct, in case it may be controlled (e.g. half cone ("mouse") in the air entry to a jet engine, such in various models of the French Dassault Mirage get airplanes, that is used to control the air flow into the jet engine by means of moving it toward the compressor stages of the engine or away from them within the air intake section.

As depicted by the exemplary embodiments of FIGS. 8A-8D and FIGS. 9A-9B, various configurations of the way the rotors in a multi-rotor system are installed, suspended, being supported by bearings and finally being rotated by rotational power sources are possible. The embodiments where all of the bearings of the rotors are disposed directly on the central axis with relatively small radii are beneficial in the sense that the bearing suspension assembly is simple and relatively cheap yet require suspension solutions for the outer rotors which provide undesired increase in the overall weight and moment of inertia as well as expected disturbances to the multi-rotor overall airflow.

Electrical motors disposed to directly drive the respective external circumference of the rotor have the benefit of being able to provide higher rotational moments with smaller motors (such as Halbach motor) however such driving solutions may cause complications of mechanical installation of the circumferential motors which typically highly sensitive to changes in the working conditions such as the accuracy of the magnetic air gap of the motor, which in such arrangement may be subject to vibrations of the rotor. The Halbach type motor may be disposed with the magnet array disposed on the rotating rotor and the electrical winding may be disposed on the multi-rotor static structure. According to embodiments of the invention the motor air gap may be radial or axial, as may fit the specific need and design. The electric motor used for driving a rotor in the multi-rotor system, whether it is a Halbach type electrical motor, or any other type of electrical motor, may be equipped with electric windings performed using litz wires in order to increase the electrical efficiency as well as reduce the total weight of the copper (or other conductive material) required for providing the electrical power to the motor. Further, in order to enable operating the electrical motor in extended range of provided power, it may be cooled by one or more of the following methods: flowing liquid Nitrogen between the motor's windings and/or around the magnets; and flowing filtered chilled fluid between the windings and/or around the magnets. When Halbach type electrical motor is used, or any other motor having high sensitivity to penetration of contaminants such as dust or snow to its air gap, means for protecting against such penetration may be used, such as enhanced mechanical protective sealing, or use of wipers for removing such contaminants if/when accumulating. Further, in order to minimize mechanical friction at the rotors' bearings common mechanical bearings may be replaced by magnetic bearings.

Electrical motors usable for multi-rotor systems according to embodiments of the present invention may be of variety of types as may be dictated by the selected configuration of the rotor system. As a general rule in order to provide maximal mechanical moment such electrical motors may use, or may comprise of solutions for reduction of inefficiency, for example—reduction of the electrical conduits of the motor using high conductivity conduits (super conductor) made of very low internal resistance materials, operating in super cold environment, etc. It would be apparent to those skilled in the art that certain set of design constrains and requirements imposed on a multi-rotor system typically dictate compromised overall solution considering and addressing the various design requirements as a result of which typically none of the requirement is fully answered but the total performance is expected to be optimal versus the set of requirements.

According to embodiments of the present invention the thrust produced by a multi-rotor system may be designed so that some of the rotors are rotated in one direction, e.g. clockwise and some are rotated in the other direction, e.g. anticlockwise, thereby the total rotational moment acting on the body of the vehicle may be reduced to minimum or even to zero simply by controlling the total thrust produced by the rotors turning in one direction and that produced by rotors turning the other direction of rotation. The ability to control separately the direction of rotation of each rotor in a multi-rotor system and the thrust provided by the rotor (e.g. by changing its angle of attack) may be useful when, for example, one or more rotors in one or more multi-rotor systems fails to properly operate (e.g. it breaks down or its drive breaks down). In such cases it may be possible to disconnect the faulty rotor from its drive and compensate for its absence by re-balancing the direction of rotation and the acquired thrust of each of the remaining rotors.

According to embodiments of the present invention the thrust produced by a multi-rotor system may be decreased in order to decrease the noise produced by the multi-rotor system, for example in order to decrease the undesired impact of this noise in an urban area. Decrease of the thrust may be achieved by one or more of the following means: reduction of the rotation speed of one or more of the rotors, adjustment of the rotors' angles of attack so as to decrease the produced noise, adjustment of the angle of the stators, etc.

According to embodiments of the present invention, a multi-rotor system of the present invention, when used for providing horizontal thrust, may be manipulated to provide reversing thrust for example for stopping forward movement or for providing reverse movement with respect to a forward reference movement.

According to embodiments of the present invention one or more multi-rotor systems of the invention may be used in vehicles capable of moving over land, over sea/water pond and/or in air or in any combination of these environments. Multi-rotor systems of the present invention may also be used in manned or in unmanned vehicles.

According to embodiments of the present invention multi-rotor systems of the invention may be used for flowing fluids, such as air, gaseous and/or liquids and such fluids which comprise solid particles in them, such as fans, blowers or pumps.

According to embodiments of the present invention rotors in multi-rotor systems of the invention may be disposed about a common axis so as to provide thrust in a common axial direction and the rotors may be disposed shifted axially with respect to each-other.

According to embodiments of the present invention multi-rotor systems may be rotated by electrical motor that engages its respective rotor via the external radius of the rotor or via the internal radius of the rotor. Electrical motor engaging the rotor via its external radius may provide higher moment with less electrical current.

According to embodiments of the present invention power to energize the electrical motors may be provided from one or more of the following electrical power sources: batteries; fuel cells; fuel that energizes a generator, solar cells and nuclear reactor.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An airborne vehicle adapted to perform vertical takeoff and landing (VTOL), comprising:
   at least two multi-rotor systems, each multi-rotor system comprising:
   at least three rotors rotatable about a common axis, wherein the outer radius of the first rotor is substantially similar to the inner radius of the second rotor, and the outer radius of a second rotor is substantially similar to the inner radius of the third rotor.

2. The airborne vehicle of claim 1 wherein each of the multi-rotor systems further comprising driving means adapted to rotate each of the rotors in a rotational speed independent of the rotational speed of the other rotors.

3. The airborne vehicle of claim 1 wherein in at least one of the multi-rotor systems the at least two rotors are disposed and rotatable in a common plane.

4. The airborne vehicle of claim 1 wherein each of the multi-rotor systems further comprising duct disposed closely around the outer radius of the out-most rotor and directed with its air flow direction coaxially with the common axis of the multi-rotor system.

5. The airborne vehicle of claim 4 wherein each of the multi-rotor systems further comprising at least one additional air duct disposed closely around outer radius of one other rotor.

6. The airborne vehicle of claim 1 wherein each of the rotors comprises two or more rotor blades evenly spaced around the common axis.

7. The airborne vehicle of claim 1 wherein each of the multi-rotor systems further comprising:
   at least one stator disposed adjacent to at least one of the rotors and adapted to control the direction of the air flow that pass through said rotor.

8. The airborne VTOL vehicle of claim 1 adapted to provide mainly vertical thrust when in takeoff and in landing maneuvering.

9. The airborne VTOL vehicle of claim 8, further adapted to provide mainly horizontal thrust when in flight maneuvering.

10. An airborne vehicle adapted to perform vertical takeoff and landing (VTOL), comprising:
    at least one first multi-rotor system directed to provide vertical lift, each of the first multi-rotor system comprising:
       at least three rotors rotatable about a common axis, the outer radius of the first rotor is substantially similar to the inner radius of the second rotor, and the outer radius of a second rotor is substantially similar to the inner radius of the third rotor; and
       driving means adapted to rotate each of the rotors in a rotational speed independent of the rotational speed of the other rotors; and
    at least one second multi-rotor system directed to provide horizontal thrust, each of the second multi-rotor system comprising:
       at least two rotors rotatable about a common axis, wherein the outer radius of the first rotor is substantially similar to the inner radius of the second rotor; and
       driving means adapted to rotate each of the rotors in a rotational speed independent of the rotational speed of the other rotors.

11. A multi-rotor system for providing air thrust, comprising:
    at least two multi-rotor assemblies disposed axially with respect to each other, each multi-rotor assembly comprising:
       at least three rotors rotatable about a common axis;
       wherein the outer radius of the first rotor is substantially similar to the inner radius of the second rotor, and the outer radius of a second rotor is substantially similar to the inner radius of the third rotor.

* * * * *